F. J. LAPOINTE.
BROACHING MACHINE.
APPLICATION FILED JUNE 25, 1920.

1,392,770.

Patented Oct. 4, 1921.
5 SHEETS—SHEET 1.

Inventor:
Francis J. Lapointe,
by Walter E. Lombard, Atty.

F. J. LAPOINTE.
BROACHING MACHINE.
APPLICATION FILED JUNE 25, 1920.

1,392,770.

Patented Oct. 4, 1921.
5 SHEETS—SHEET 4.

Inventor:
Francis J. Lapointe,
by Walter E. Lombard.
Atty.

F. J. LAPOINTE.
BROACHING MACHINE.
APPLICATION FILED JUNE 25, 1920.

1,392,770.

Patented Oct. 4, 1921.
5 SHEETS—SHEET 5.

Inventor:
Francis J. Lapointe,
by Walter E. Lombard,
Atty.

UNITED STATES PATENT OFFICE.

FRANCIS J. LAPOINTE, OF ANN ARBOR, MICHIGAN.

BROACHING-MACHINE.

1,392,770.   Specification of Letters Patent.   Patented Oct. 4, 1921.

Application filed June 25, 1920. Serial No. 391,798.

*To all whom it may concern:*

Be it known that I, FRANCIS J. LAPOINTE, a citizen of the United States of America, and a resident of Ann Arbor, in the county of Washtenaw and State of Michigan, have invented certain new and useful Improvements in Broaching-Machines, of which the following is a specification.

This invention relates to broaching machines and particularly to that class of broaching machines actuated by a gear meshing with a reciprocating rack to which the tool holder is secured.

The object of the invention is the production of a double acting broaching machine in which one carriage is movable in one direction during the broaching operation while the other carriage is moving in the opposite direction into position to commence another broaching operation.

The further object of the invention is the simplification of the operating mechanisms of machines of this character.

The invention consists in certain novel features of construction and arrangement of parts which will be readily understood by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Figure 1:
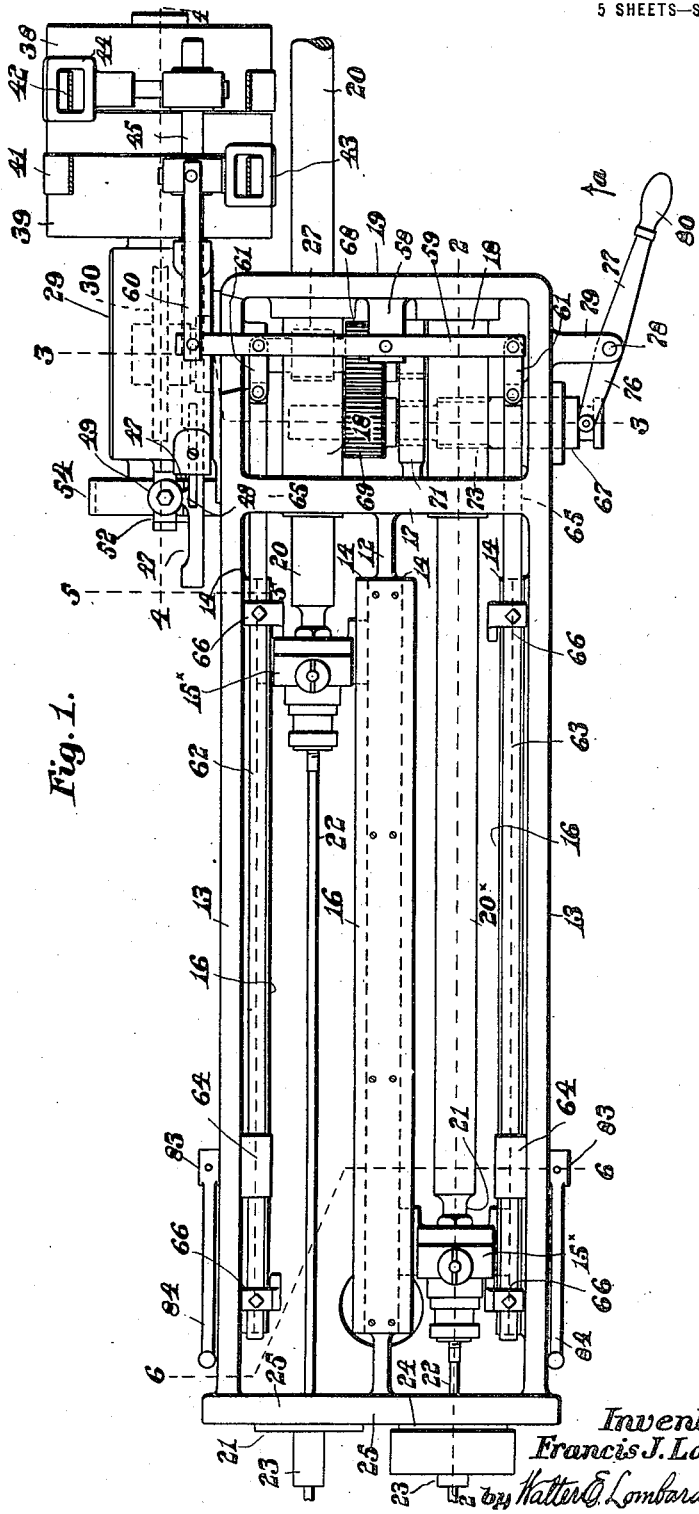
Figure 1 represents a plan of a broaching machine embodying the principles of the present invention.
Figure 2:
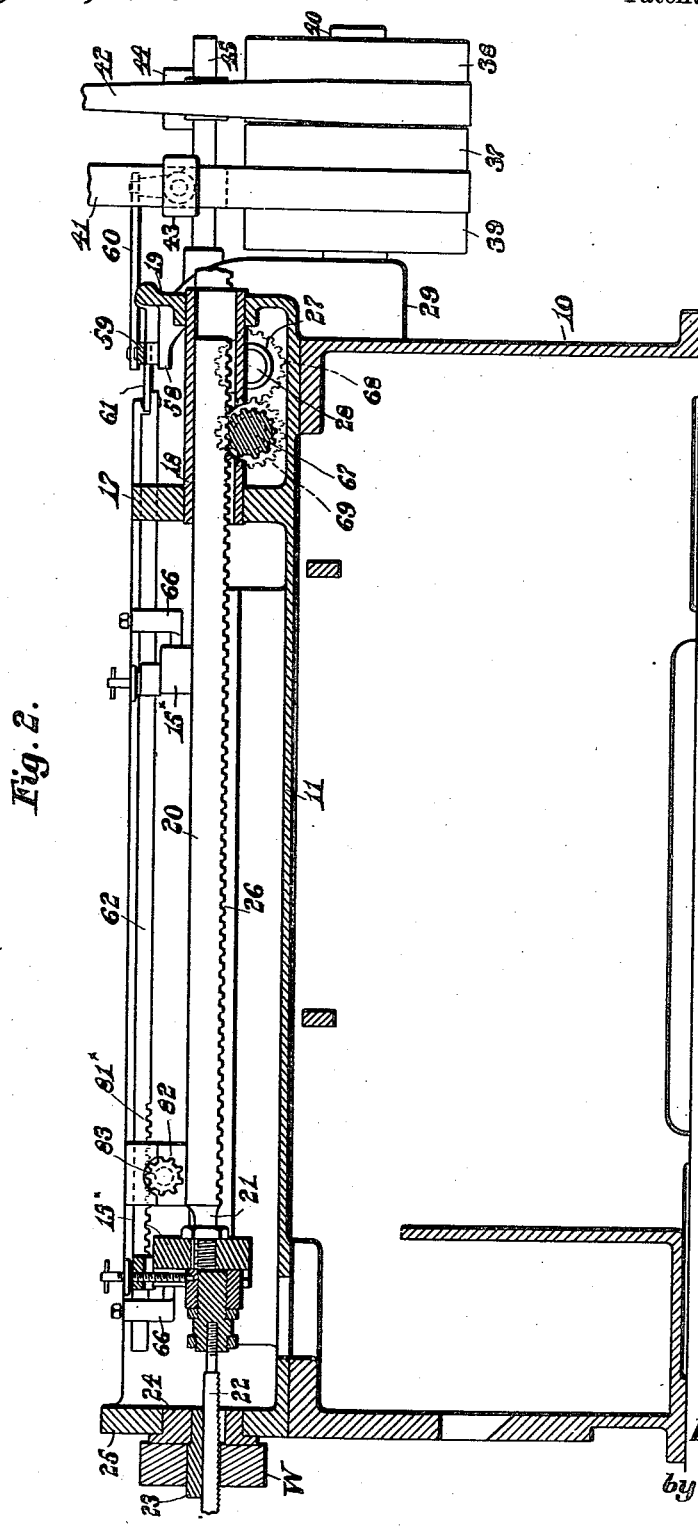
Fig. 2 represents a longitudinal vertical section of the same on line 2, 2, on Fig. 1.

Figs. 3 to 6 inclusive are drawn to a larger scale than Figs. 1 and 2.

Similar characters indicate like parts throughout the several figures of the drawings.

In the drawings, 10 is a framework having superimposed thereon a casing 11 open at the top and provided with a central upwardly extending rib 12 midway between the side walls 13, these walls 13 and central rib 12 having flanges 14 extending toward each other and forming guides for the outwardly extending projections 15 of the reciprocating carriages or tool holders $15^x$.

The projecting members 15 are prevented from upward movement by plates 16 secured above the flanges 14.

The casing 11 is provided with a transverse wall 17 through which extend the ends of two cylindrical sleeves 18, the opposite ends of which are disposed in the end wall 19 of said casing.

Each of these sleeves 18 form supports for a reciprocating cylindrical member 20, one end of which has a reduced threaded shank 21 secured to the reciprocating carriage or tool holder $15^x$.

The reciprocating carriage $15^x$ has adjustably mounted thereon a broaching tool 22 extending through a work support 23 mounted in a bushing 24 positioned in the end frame 25 of the casing 11.

The carriage or tool holder $15^x$ may be of any well-known construction.

Each cylindrical member 20 is provided with a plurality of rack teeth 26.

The rack teeth 26 of one member 20 mesh with the teeth of a gear 27 mounted upon and revoluble with a shaft 28 extending through a side wall 13 and into a housing 29 for the driving mechanism.

This driving mechanism consists of a worm wheel 30 keyed to the shaft 28 and having teeth meshing with a worm 31 secured to and revoluble with a drive shaft 32.

Figure 4:
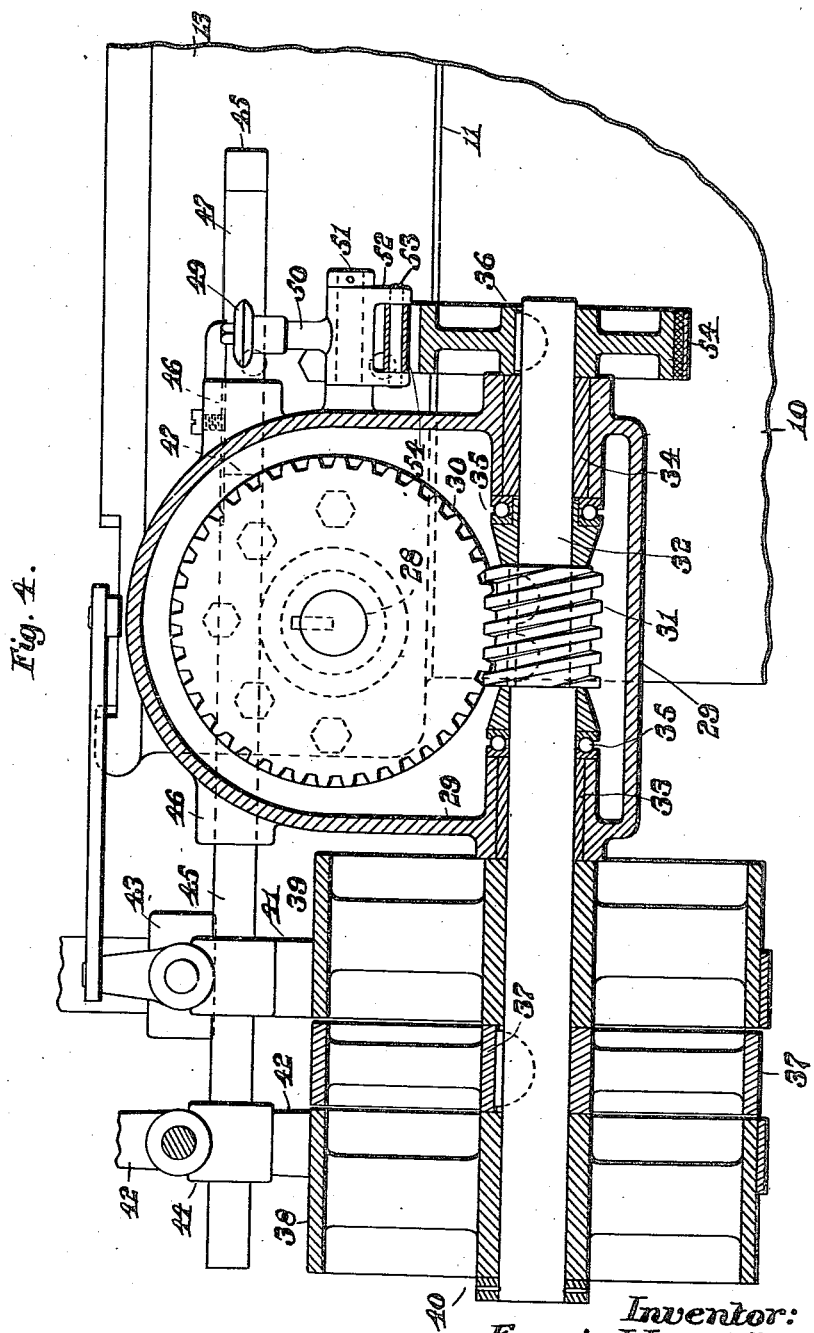
Fig. 4 represents a vertical section on line 4, 4, on Figs. 1 and 3.
Figure 5:
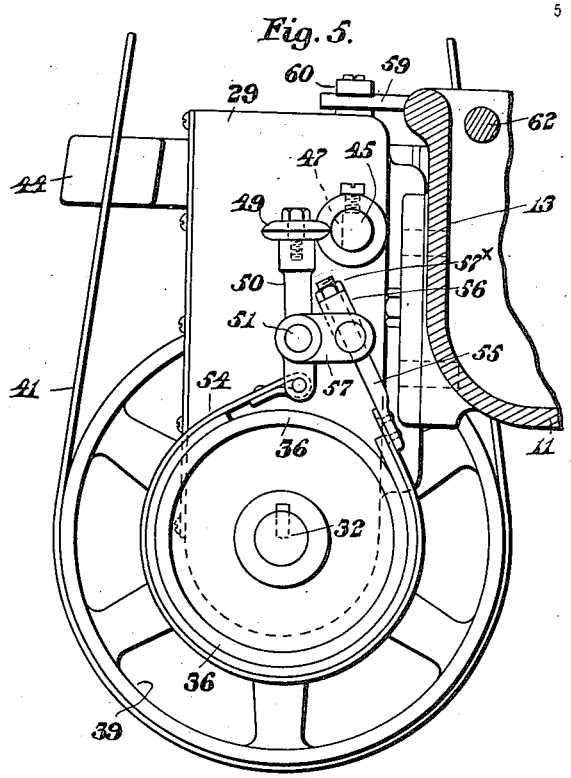
Fig. 5 represents a vertical section on line 5, 5, on Fig. 1.
Figure 6:
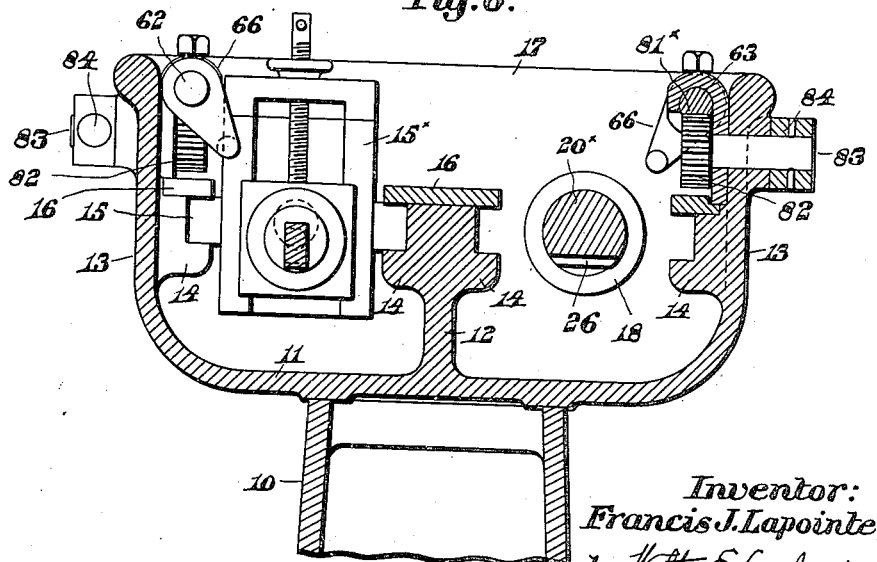
Fig. 6 represents a vertical section on line 6, 6, on Fig. 1.

This drive shaft 32 is revolubly mounted in bushings 33 and 34 positioned in the walls of the housing 29 as shown in Fig. 4 of the drawings.

Between the ends of the bushings 33 and 34 and adjacent the ends of the worm 31 are anti-friction members 35 adapted to take up the end thrust of said worm when the machine is in operation.

One end of the shaft 32 has secured thereto a brake wheel 36 while the opposite end of said shaft has secured thereto a tight or fast pulley 37 on opposite sides of which are loose pulleys 38 and 39.

The extreme outer end of said shaft 32 has a pin 40 or some similar member mounted thereon to retain the loose pulley 38 in position adjacent to the fast pulley 37.

When the machine is not in operation the loose pulley 39 has a driving belt 41 disposed thereon while the loose pulley 38 has a cross belt 42 disposed thereon. These belts 41 and 42 extend through belt shifters 43 and 44 mounted upon a rod 45 adapted to be reciprocated in bearings 46 in the housing 29.

This rod 45 is provided with two cam depressions 47 separated by a raised projection 48.

When the belts 41 and 42 are disposed upon the loose pulleys 39 and 38, the raised projection 48 is opposite to and in contact with a roller 49 revolubly mounted on the upper end of a member 50 pivoted at 51 and having arms or ears 52 extending downwardly from said pivot and carrying a pin 53 to which one end of a brake band 54 is secured.

This brake band 54 partially surrounds the brake wheel 36 and the opposite end of said brake band 54 is secured to a threaded rod 55 extending through a sleeve 56 secured to the outer end of an arm 57 extending laterally from the pivot 51 of the member 50.

The rod 55 may be adjusted relatively to the sleeve 56 and locked in its adjusted position by means of the nut $57^x$.

When the roller 49 rests upon the projection 48, the brake band 54 is in tight frictional contact with the brake wheel 36 and prevents the driving shaft 32 from rotating.

When the belt shifting devices are moved to place one of the belts 41 or 42 upon the fast or tight pulley 37, the rod 45 forming part of said shifting devices will also be moved so that a depression 47 in said rod 45 will be opposite to the roller 49 and permit the brake band 54 to release its hold upon the brake wheel 36 thereby allowing the driving shaft 32 to be rotated in one direction or the other according to which belt 41, 42 has been moved onto the tight or fast pulley 37.

It is obvious therefore that the driving shaft is frictionally held from rotation when the driving belts 41, 42 are positioned upon the loose pulleys but as soon as either of these belts are moved onto and in frictional contact with the fast or tight pulley 37 the gripping of the brake band 54 upon the brake wheel 36 is released through the movement of the cam rod 35 having the depressions 47 therein.

The end wall 19 is provided with an inwardly extending ear 58 to which is pivoted a lever 59, one end of which has a link connection 60 with a belt shifting device 43.

This lever 59 is connected by links 61 to the ends of rods 62 and 63 mounted in bearings 64 and 65 formed upon or supported by the casing 11.

Each of these rods 62 and 63 have stop members 66 secured thereto in the path of the reciprocating carriage or tool holder $15^x$ so that as the tool holder approaches the extreme end of its movement in one direction it will come into contact with one of these stop members and move it and the rod to which it is attached a distance sufficient to actuate the belt shifting devices and move the belt from the tight pulley to one of the loose pulleys at the same time through the cam rod 45 effecting the operation of the brake mechanism and stopping the machine.

Mounted in bearings in the casing 11 is a shaft 67 parallel to the shaft 28, these shafts 28 and 67 having gears 68 and 69 keyed thereto and forming a driving connection from the shaft 28 to the shaft 67.

Figure 3:
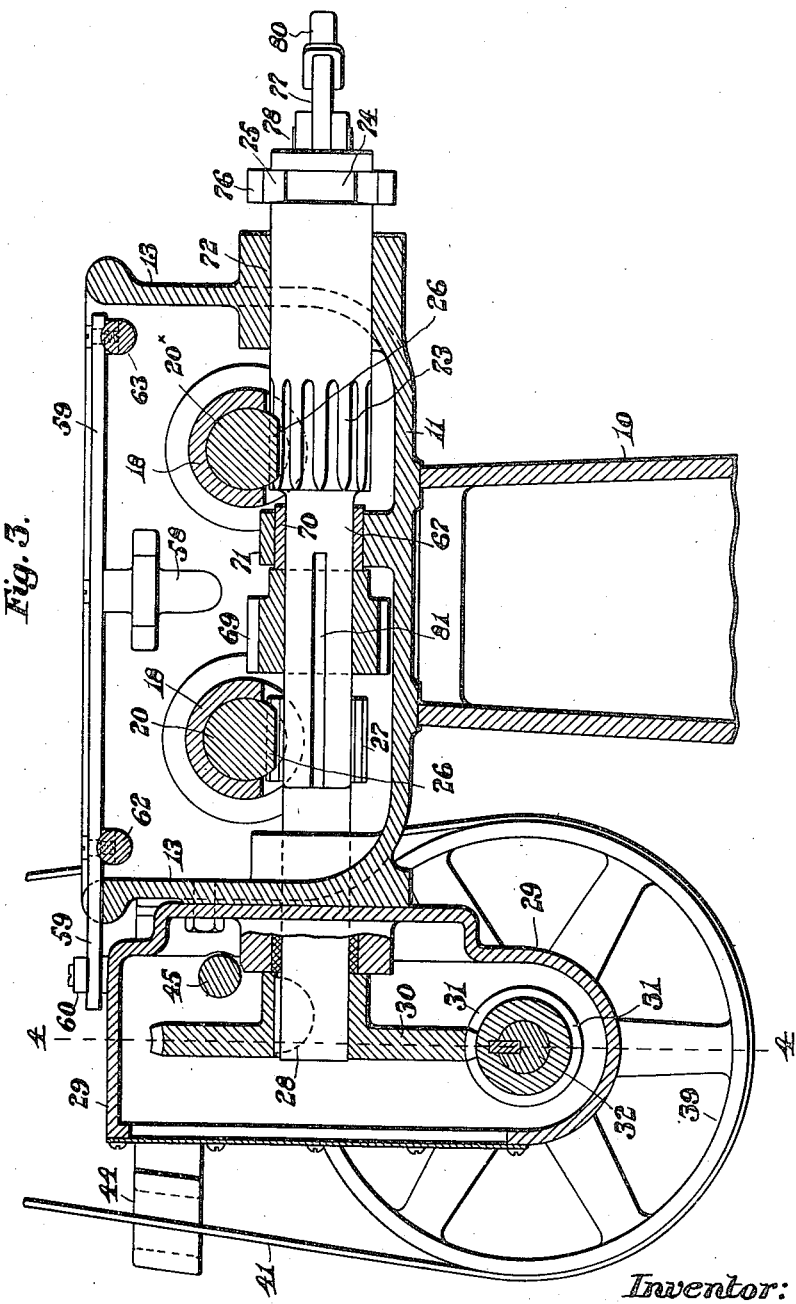
Fig. 3 represents a transverse section of the same on line 3, 3, on Fig. 1.

The shaft 67 has a reduced portion mounted in a bushing 70 positioned in a rib 71 extending upwardly from the bottom of the casing 11 as shown in Fig. 3 of the drawings.

The enlarged portion of the shaft 67 is mounted in a bearing 72 in a side wall 13 of said casing 11 and the inner end of said enlarged portion has teeth 73 cut therein and forming a gear to drive the second cylindrical member $20^x$.

The outer end of the enlarged portion of the shaft 67 has an annular groove 74 formed therein which is engaged by rollers 75 mounted in the forked end 76 of a lever 77 pivoted at 78 to an ear 79 extending outwardly from a side wall 13 of the casing 11.

By moving the handle 80 in the direction of the arrow $a$ on Fig. 1 of the drawings, the shaft 67 may be moved endwise to disengage the teeth 73 from the rack teeth 26 of the cylindrical member $20^x$, the inner ends of the teeth 73 being tapered in order to readily effect an engagement with the rack teeth 21 when the shaft 67 is again moved inwardly.

In order to provide for this end movement of the shaft 67, the reduced end thereof projects normally a considerable distance beyond the connecting gear 69 as indicated in Fig. 3 and has a long keyway 81 engaging with a key in said connecting gear 69.

By means of this end movement of the shaft 67 disengaging the gear 73 from the rack teeth 26 of the reciprocating cylindrical member 20ˣ, the members 20, 20ˣ may be adjusted relatively to each other to secure the required stroke and then the gear 73 may again be engaged with the rack teeth 26 of the member 20ˣ or if desired, the gear 73 may be moved from engagement with the rack teeth of the reciprocating cylindrical member 20ˣ and remain disengaged while the machine is operated with a single reciprocating member 20.

It will thus be seen that the machine is equally adapted for either single or double action.

The rods 62 and 63 are provided near one end with a plurality of rack teeth 81ˣ with which mesh the teeth of a pinion 82 on the inner end of a short shaft 83 extending through the side walls 13 of the casing 11.

The outer end of the short shaft 83 has a handle 84 secured thereto by means of which said shaft may be moved about its axis to cause the rotation of the pinion 82 and the reciprocation of either of the rods 62 and 63 as the case may be.

By means of this construction the operator may, by actuating the handle 84 set the machine in operation from either side of said machine, the ends of the rods 62, 63 being connected to the belt shifting device through the medium of the pivoted lever 59 and link 60.

In the operation of the machine the work W is placed upon the work support 23 with the broaching tool 22 extending through the same and secured to the reciprocating carriage 15ˣ.

The operator then moves one of the handles 84 to shift the rods 62, 63 and position the proper belt 41, 42 on the fast pulley 37.

One of the reciprocating tool holders or carriages 15ˣ will then be moved toward the opposite end of the machine or to the right as shown in Figs. 1 and 2 of the drawings while the other reciprocating tool holder or carriage 15ˣ is moving toward the end plate 25.

The broaching tool 22 will be drawn through the work until the reciprocating carriage 15ˣ comes into contact with a stop member 66 on the rod 63 and the continued movement of the carriage 15ˣ will move the rod 63 sufficiently to return the pivoted lever 59 to its normal position as indicated in Fig. 1 of the drawings, this return movement of the lever 59 causing the belt shifting mechanism to return the belts 41, 42 to their normal positions on the loose pulleys 38, 39.

The actuation of the belt shifting mechanism will set the brake band 54 on the brake wheel 36 and stop the machine.

At this time the other reciprocating tool holder or carriage has returned to its starting position adjacent the end plate 25 and work having been placed upon the other work support 23 and a broaching tool inserted therethrough, the operator then again manipulates a handle 84 to bring the other belt upon the tight pulley 37 at the same time releasing the brake band 54.

The second tool holder or carriage 15ˣ will then move toward the transverse wall 17 while the first-mentioned carriage 15ˣ turns again to its normal position.

The length of the stroke of the brake members 20, 20ˣ may be regulated by adjusting the stop members 66 on the rods 62, 63 and clamping them in their adjusted position it being understood that this adjustment is made when the gear 73 is out of mesh with the teeth 26 of the member 21ˣ and the tool holder 15ˣ on the member 20 is in its starting position adjacent to the end plate 25.

It is believed that the operation and the many advantages of the invention will be fully understood from the foregoing description.

Having thus described my invention, I claim:

1. In a machine of the class described, a cylindrical member provided with a plurality of rack teeth; a tool holder secured to an end thereof; a cylindrical sleeve through which said member is adapted to be reciprocated; a revoluble gear meshing with said rack teeth; a worm wheel for rotating said gear; and a driving worm coacting with said worm wheel.

2. In a machine of the class described, two cylindrical members each provided with a plurality of rack teeth; a tool holder secured to an end of each member; a cylindrical sleeve for each member and through which it is adapted to reciprocate; a driving gear for each rack member; parallel shafts for said driving gears; a driving connection between said shafts; and means for moving one shaft endwise to disengage its gear from the coacting rack member.

3. In a machine of the class described, two cylindrical members each provided with a plurality of rack teeth; a tool holder secured to an end of each member; a cylindrical sleeve for each member and through which it is adapted to reciprocate; a driving gear for each rack member; parallel shafts for said driving gears; a driving connection between said shafts; and a pivoted lever for moving one shaft endwise to disengage its gear from the coacting rack member.

4. In a machine of the class described, two cylindrical members each provided with a plurality of rack teeth; a tool holder secured to an end of each member; a cylindrical sleeve for each member and through which it is adapted to reciprocate; a driving shaft; a gear thereon meshing with the teeth of one member; a parallel shaft having teeth cut therein meshing with the teeth of the other member; a driving connection between said shafts; and means for moving said parallel shaft endwise to disengage the teeth thereon from its coacting rack teeth.

5. In a machine of the class described, a member provided with a plurality of rack teeth; a revoluble shaft; a driving gear thereon meshing with said rack teeth; a worm wheel thereon; a worm meshing therewith; a driving shaft therefor; a pulley keyed to said driving shaft; a brake wheel on said shaft; belt shifting mechanism coacting with said pulleys; a brake band coacting with said brake wheel; and means actuated by the belt shifting mechanism for controlling the operation of said brake band.

6. In a machine of the class described, a member provided with a plurality of rack teeth; a revoluble shaft; a driving gear thereon meshing with said rack teeth; a worm wheel thereon; a worm meshing therewith; a driving shaft therefor; a pulley keyed to said driving shaft; a brake wheel on said shaft; belt shifting mechanism coacting with said pulleys; a brake band coacting with said brake wheel; and means actuated by the belt shifting mechanism for tightening the brake band when the belts are on said loose pulleys.

7. In a machine of the class described, a member provided with a plurality of rack teeth; a revoluble shaft; a driving gear thereon meshing with said rack teeth; a worm wheel thereon; a worm meshing therewith; a driving shaft therefor; a pulley keyed to said driving shaft; a brake wheel on said shaft; belt shifting mechanism coacting with said pulleys including a reciprocating rod having separated depressions therein; a brake band coacting with said brake wheel; a pivoted member having arms to which the opposite ends of said brake band are secured; and a roller on said pivoted member coacting with said depressions in the reciprocating rod.

8. In a machine of the class described, a member provided with a plurality of rack teeth; a revoluble shaft; a driving gear thereon meshing with said rack teeth; a worm wheel thereon; a worm meshing therewith; a driving shaft therefor; a pulley keyed to said driving shaft; a brake wheel on said shaft; belt shifting mechanism coacting with said pulleys including a reciprocating rod having separated depressions therein; a brake band coacting with said brake wheel; a pivoted member having arms to which the opposite ends of said brake band are secured; a roller on said pivoted members coacting with said depressions in the reciprocating rod; and means for adjusting one end of said brake band relatively to the arm to which it is attached.

9. In a machine of the class described, a member provided with a plurality of rack teeth; a revoluble shaft; a driving gear thereon meshing with said rack teeth; a worm wheel thereon; a worm meshing therewith; a driving shaft therefor; a pulley keyed to said driving shaft; a brake wheel on said shaft; belt shifting mechanism coacting with said pulleys including a reciprocating rod having separated depressions therein; a brake band coacting with said brake wheel; a pivoted member having an arm to which one end of said brake band is secured; a lateral arm on said pivoted member; a sleeve mounted in the end of said lateral arm; a threaded rod secured to the other end of said brake band and extending through said sleeve; an adjusting nut on the end of said threaded rod; and a roller on said pivoted member coacting with the depressions in said reciprocating rod.

10. In a machine of the class described, a member provided with a plurality of rack teeth; a revoluble shaft; a driving gear thereon meshing with said rack teeth; a worm wheel thereon; a worm meshing therewith; a driving shaft therefor; tight and loose pulleys on said driving shaft; belt shifting devices; a pivoted lever; a link connection between said pivoted lever and belt shifting devices; reciprocating tool holders; a rod for each tool holder; stops thereon adapted to be engaged by said tool holders to move said rod endwise; and a link between each rod and said pivoted lever.

11. In a machine of the class described, a member provided with a plurality of rack teeth; a revoluble shaft; a driving gear thereon meshing with said rack teeth; a worm wheel thereon; a worm meshing therewith; a driving shaft therefor; tight and loose pulleys on said driving shaft; belt shifting devices; brake mechanism for the driving shaft controlled by the actuation of said belt shifting devices; a pivoted lever; a link connection between said pivoted lever and belt shifting devices; reciprocating tool holders; a rod for each tool holder; stops thereon adapted to be engaged by said tool holders to move said rod endwise; and a link between each rod and said pivoted lever.

12. In a machine of the class described, a member provided with a plurality of rack teeth; a revoluble shaft; a driving gear thereon meshing with said rack teeth; a worm wheel thereon; a worm meshing therewith; a driving shaft therefor; tight and loose pulleys on said driving shaft; belt shifting devices; a pivoted lever; a link connection between said pivoted lever and belt shifting devices; reciprocating tool holders; a rod for each tool holder; rack teeth on one of said rods; a pinion meshing therewith; a handle for oscillating said pinion; stops on said rods adapted to be engaged by said tool holder to move said rods endwise; and a link between each rod and said pivoted lever.

13. In a machine of the class described, two reciprocating members; a tool holder secured to an end of each member; a worm wheel; a driving worm for said worm gear; and means actuated by said worm wheel for simultaneously reciprocating said members in opposite directions.

14. In a machine of the class decribed, two reciprocating rack members; a tool holder secured to an end of each member; a driving gear for each rack member; parallel shafts for said driving gears; a driving connection between said shafts; and means for moving one shaft endwise to disengage its gear from the coacting rack member.

15. In a machine of the class described, two reciprocating rack members; a tool holder secured to an end of each member; a driving gear for each rack member; parallel shafts for said driving gears; a driving connection between said shafts; and a pivoted lever for moving one shaft endwise to disengage its gear from the coacting rack member.

16. In a machine of the class described, two reciprocating rack members; a tool holder secured to an end of each member; a driving gear for each rack member; a driving shaft; a gear thereon meshing with the teeth of one member; a parallel shaft having teeth cut therein meshing with the teeth of the other member; a driving connection between said shafts; and means for moving said parallel shaft endwise to disengage the teeth thereon from its coacting rack teeth.

Signed by me at city of Ann Arbor, county of Washtenaw, State of Michigan, this 22 day of June, 1920.

FRANCIS J. LAPOINTE.